July 11, 1944.   R. A. SANDBERG   2,353,589
SEAL FOR PRESSURE VESSELS AND THE LIKE
Filed April 24, 1942
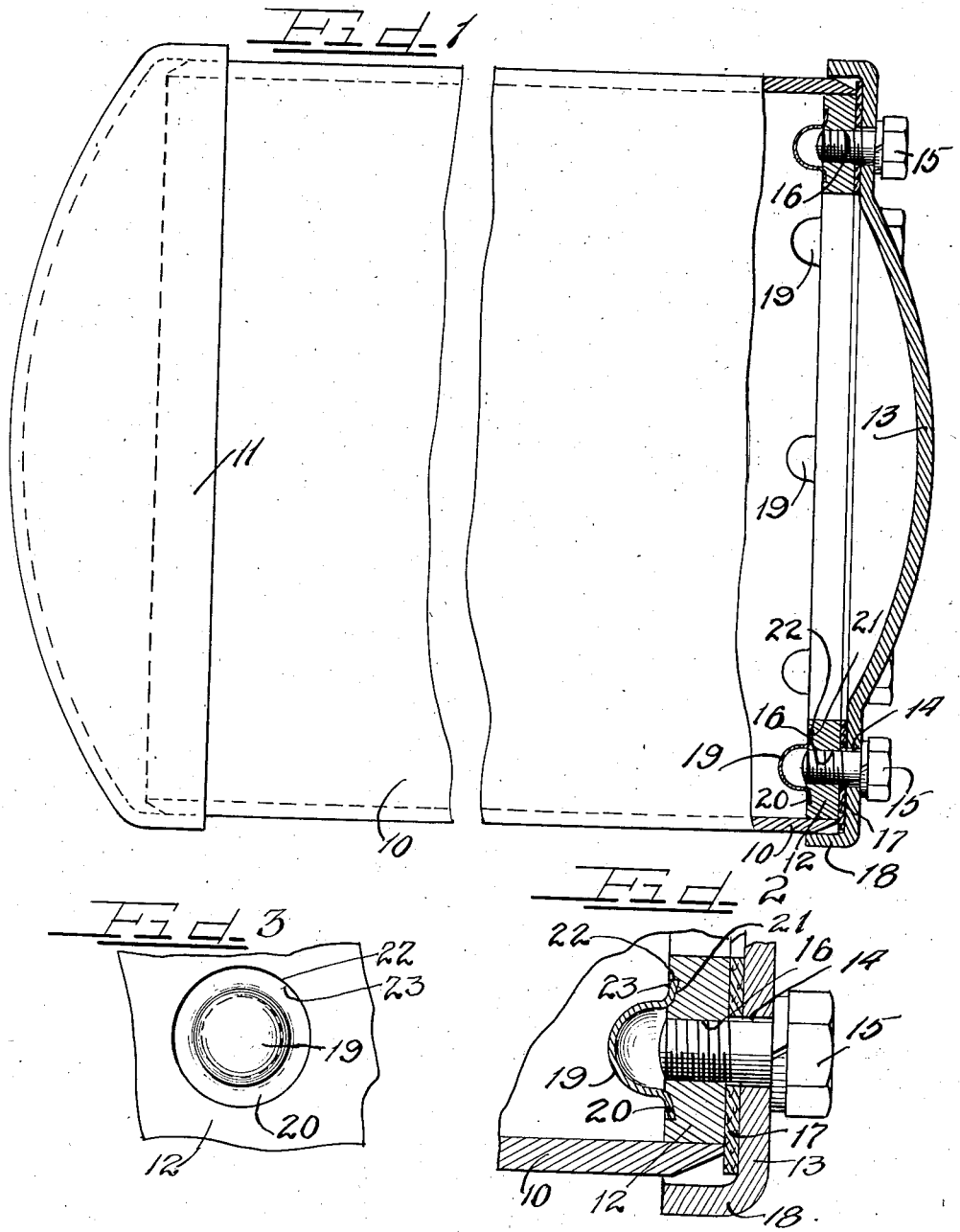
Inventor
Ray A. Sandberg
by Charles Hill
Attys.

Patented July 11, 1944

2,353,589

UNITED STATES PATENT OFFICE 2,353,589

SEAL FOR PRESSURE VESSELS AND THE LIKE

Ray A. Sandberg, Waukegan, Ill., assignor to Houdaille-Hershey Corporation, Detroit, Mich., a corporation of Michigan Application April 24, 1942, Serial No. 440,275

3 Claims. (Cl. 220—46)

My invention relates to sealing means particularly adaptable and useful in containers for preventing leakage along the threads of screws by which closure members or covers are secured to the container body.

There is no difficulty in getting a good seal, by suitable gasket means, between a cover and its seat on the container body, but where the securing screws engage in tapped holes which extend entirely through the cover seat there is apt to be leakage along the screw threads, and more particularly if the liquid or gas within the container is under pressure.

Where the cover seat is in the form of a casting, thickened portions or bosses may be provided on the casting for blind tap holes, that is, tap holes which do not extend entirely through the bosses, but only for a distance sufficient for chip clearance and threading length to receive the cover securing screws.

Where a seat member for a container is of stock metal plate, blind hole tapping would be impractical and uneconomical as the seat member would have to be made of an all-over thickness far in excess of that required to produce desired structural strength. It is far more desirable to have the seat of a thickness commensurate with the desired strength and resistance characteristics and to tap entirely through the seat, and the important object of my invention is to provide for sealing such tap holes against entrance of liquid or gas from the interior of a container and leakage thereof along the threads to the exterior. I preferably accomplish this by means of sealing caps secured to the inner side of a cover seat to close the tap holes against the interior of the container and with the caps of sufficient depth to receive the ends of the cover securing screws.

My improved sealing means is embodied in the structure shown on the drawing, in which—

Figure 1 is a side elevation of a container, partly in section, to show the sealing means;

Figure 2 is an enlarged section to more clearly show application of a sealing cap; and Figure 3 is an inner side view of the structure shown on Figure 2.

Figure 1 shows a sheet metal tank 10 having a bottom head 11 of sheet metal secured thereto, preferably by brazing or welding, to form a sealed joint. In the other end of the tank body a ring 12 of metal plate is secured and its joint with the tank body sealed as by welding or brazing. The cover 13 is of sheet metal and may be domed as shown, this cover having holes 14 for receiving screws 15 for securing it to the seat ring 12, the tap holes 16 extending entirely through the seat member for reception of the threaded ends of the screws, a gasket 17 of suitable material being interposed between the cover and seat member. The peripheral portion 18 of the cover may be deflected inwardly for receiving and surrounding the end of the container body.

In accordance with my invention, after the holes are tapped in the seat ring and before the ring is applied to the container body, I secure to the inner side of the ring, over the inner end of each tap hole, a sealing cap 19 to shield the tap holes against the inner side of the container. The cap body is cylindrical or dome shaped and has the lip or flange 20 by which it may be secured against the inner side of the seat ring. Preferably the ring is counterbored concentrically with the tap holes 16 to provide the annular seating surfaces 21 for the cap flanges and, as shown, the cap flanges deflect forwardly away from the radial plane and the seat 21 is correspondingly inclined. The caps may be made economically by progressive die operations and the outer diameter of the cap flange is made slightly less than the diameter of the shoulders 22 of the countersunk recesses in the seat ring. When the caps are then applied they will fit loosely into the recesses, and by means of a suitable hand tool or die having approximately the contour of the caps, the caps are expanded radially for secure engagement of the edges of their flanges with the shoulders 22 of the recesses and with the flanges against the recess seats 21. The depth of the shoulder 22 is preferably slightly greater than the depth of the flange edge, so as to provide a shallow annular cup or depression 23 into which brazing metal or copper paint or plating material may be applied to secure the caps rigidly to the seat ring and to seal the joints between the caps and the ring so as to seal the inner ends of the tap holes 16 against the interior of the container.

With the arrangement shown it is also possible to spot weld the flanges of the caps to the seat ring for sealed joints. With the sealing caps thus applied to the seat ring, the ring is then inserted into the end of the container and brazed or otherwise secured thereto with a sealing joint. When the cover is applied and secured to the seat ring by the screws 15, with the interposed gasket 17, the container will be entirely sealed against leakage of liquid or gas, and furthermore, the threads and screws will be protected against access thereto by any liquid or gas in the container which might have corrosive properties.

It is evident that my improved sealing means may be employed in various devices or structures where it is desired to seal tap threading and screws therein against access to and leakage of liquids or gases, and I do not, therefore, desire to be limited to the exact structure, arrangement and application shown and described.

I claim as follows:

1. In a container having a seat ring secured at one end thereof and a cover therefor, tapped holes extending entirely through said ring, screws extending into said tapped holes for securing the cover to the ring, the inner side of said ring being countersunk to provide annular recesses with sloping bottoms around the inner ends of said tapped holes, and domed sealing caps having sloping flanges engaging in said recesses and sealed therein whereby said caps will protect said tapped holes and screws against access by fluid within the container.

2. A container having a seat ring secured at one end thereof and a cover therefor, tapped holes extending entirely through said ring, screws extending into said tapped holes for securing the cover to the ring, the inner side of said ring being countersunk to provide annular recesses around the inner ends of said tapped holes, and a sealing cap at each recess having a flange frictionally engaging in the recess and sealed therein whereby said caps will protect said tapped holes and screws against access by fluid within the container.

3. In a container having a seat ring secured at one end thereof and a cover therefor, tapped holes extending entirely through said ring, screws extending into said tapped holes for securing the cover to the ring, the inner side of said ring being countersunk to provide annular recesses around the inner ends of said tapped holes, and a sheet metal sealing cap at each recess frictionally engaging at its edge in the recess and sealed therein whereby said caps will protect said tap holes and screws against access by fluid within the container.

RAY A. SANDBERG.